3,313,148
APPARATUS FOR MEASUREMENT OF THE CHARACTERISTICS OF INTERNAL FRICTION
Daniel Dautreppe, Grenoble, Emmanuel Friess, Meylan, and Antoine Salvi, Fontaine, France, assignors to Commissariat à l'Energie Atomique, Paris, France.
Filed May 21, 1964, Ser. No. 377,138
Claims priority, application France, May 29, 1963, 936,466
4 Claims. (Cl. 73—99)

The present invention relates to a method of measurement of the characteristics of internal friction of a sample which is subjected to periodic deformations. The invention also relates to a device for the practical application of this method or of a similar method.

Certain methods among those which are already known consist in subjecting said sample to a periodic deformation by torsion, in detecting the amplitude of the deformation, in comparing this amplitude with a reference amplitude, in making use of the signal which results from this comparison for the purpose of correcting the amplitude of the deformation in such a manner as to make it equal to the reference amplitude and in determining the characteristics of said signal which are a function of the characteristics of internal friction of the sample.

The object of this invention is to improve the sensitivity and fidelity of measurements taken in accordance with methods of this kind.

To this end, the invention is directed to a method of measurement of the characteristics of internal friction of a sample, said method consisting in subjecting said sample to a periodic deformation as a result of torsion and in measuring the energy which is necessary for the purpose of maintaining the amplitude of the deformation at a constant value, characterized in that there is carried out a frequency modulation with a frequency swing which is proportional to the amplitude of the deformation, in that the modulation is detected in order to obtain a voltage which is proportional to the frequency swing and in that said voltage is measured as well as the difference between said voltage and a reference voltage, said difference being employed for the purpose of maintaining the amplitude of the deformation at said constant value.

There will now be described below by way of non-limitative example one particular mode of application of the method in accordance with the invention and one form of embodiment of the device. Reference will be made in the following description to the accompanying drawings, in which.

Figure 1:
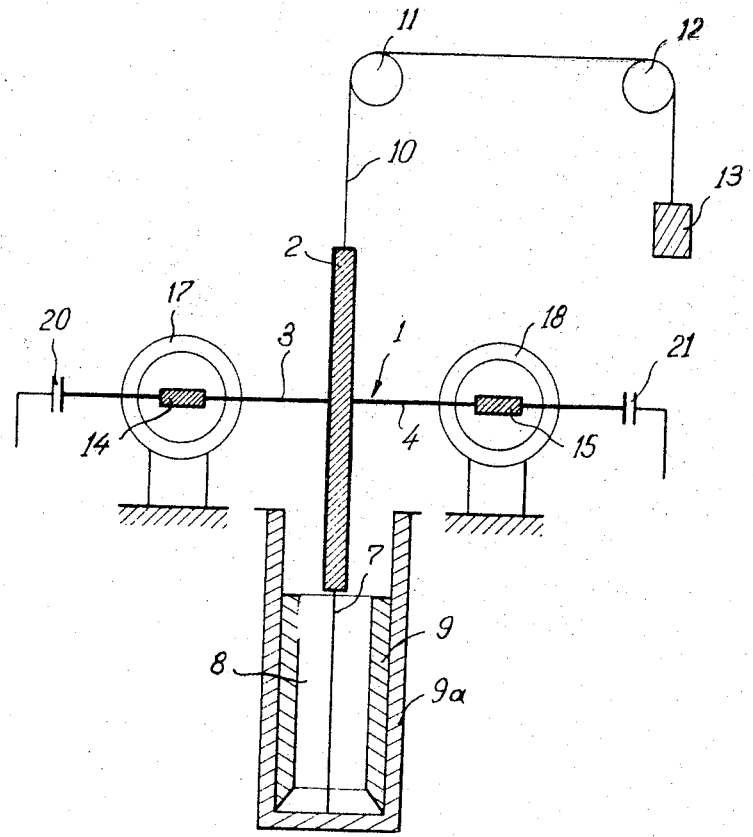
FIG. 1 represents a diagrammatic view in elevation of an electronic torsion pendulum in accordance with the invention.
Figure 2:
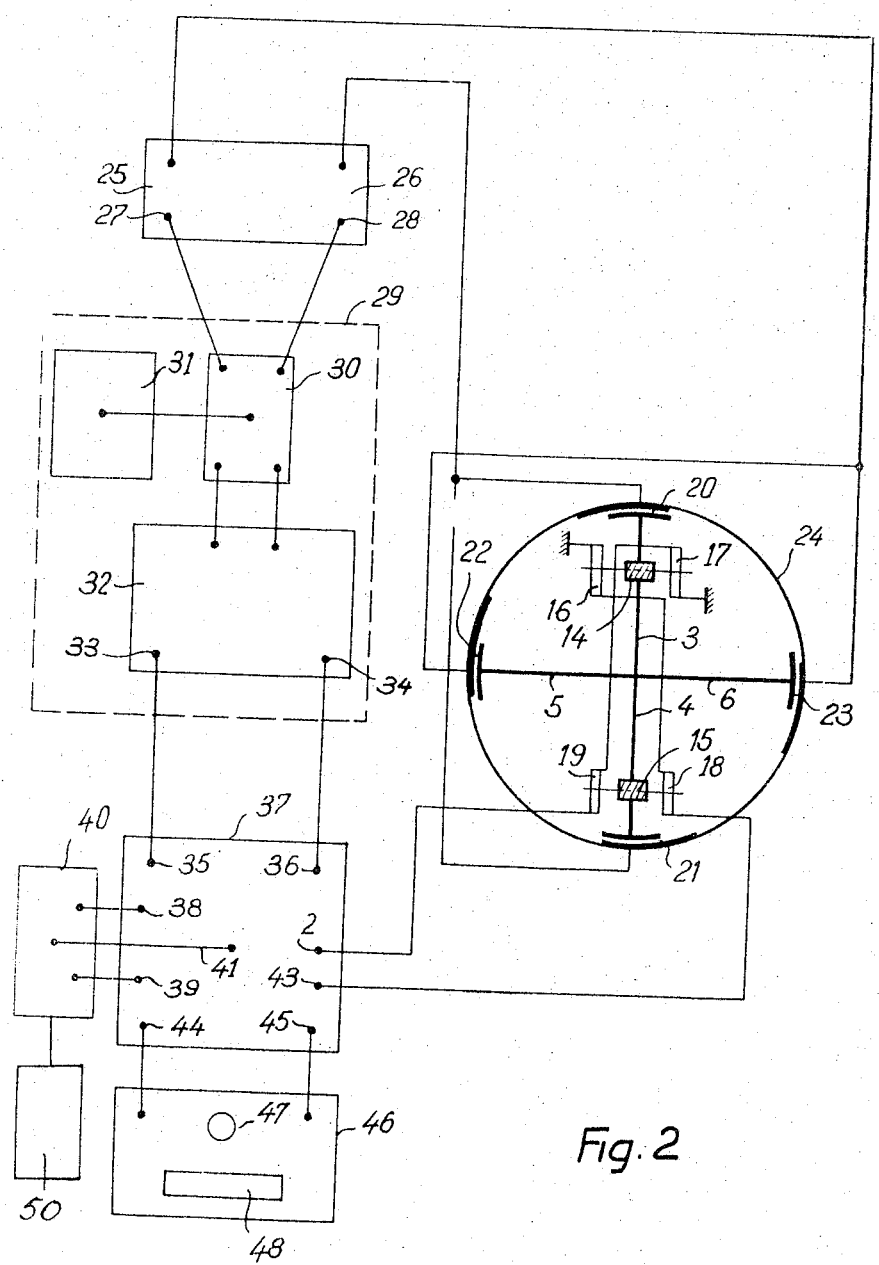
FIG. 2 represents a diagrammatic overhead view of said torsion pendulum together with the apparatus employed for the purpose of maintaining the movements of oscillation and for the purpose of measuring the characteristics of internal friction.

As represented in FIGS. 1 and 2, the torsion pendulum consists of an inertia fly-wheel 1 constituted by a vertical spindle 2 and horizontal arms 3, 4, 5 and 6 which are arranged in a cross. A vertical torsion wire 7 is rigidly fixed to the bottom extremity of the spindle 2 and is formed of the material whose internal structure it is desired to study. The dimensions of said wire are determined as a function of the frequency and the amplitude of the oscillatory movements and of the yield strength of the material.

The aforesaid torsion wire 7 is entirely located within the heat-insulated chamber 8 and the bottom extremity thereof is secured to the base of this latter. The chamber 8 is provided with a double wall 9–9a which makes it possible at will either to heat or to cool said chamber, and is further provided with means for indicating the internal temperature of the torsion wire. These means are not shown in the drawings.

A suspension wire 10 is secured to the top extremity of the spindle 2 and is guided over pulleys 11 and 12. The suspension wire and the torsion wire are subjected to the same deformation stresses in order not to disturb the measurements which are taken. The suspension wire must not be subjected to torsion or must have characteristics of internal friction which are perfectly known or else have a length such that said suspension wire does not have any appreciable influence on the measurements, taking account of the precision which it is sought to achieve. There is attached to the extremity of said wire a counterweight 13 which serves to balance the weight of the inertia fly-wheel 1 and to exert a slight longitudinal pull on the torsion wire 7.

Any other arrangement of the torsion wire 7 and of the inertia fly-wheel 1 can be adapted, but that which is described above offers a number of advantages: in particular, this arrangement permits of ready access to the heat-insulated chamber 8 and makes it possible to vary the tractive force to which the torsion wire 7 is subjected without any limitation being imposed by the weight of the fly-wheel.

The arms 3 and 4 of the inertia fly-wheel 1 which are located in the line of extension of each other carry magnets 14 and 15 respectively which are subjected to the action of air-coil inductance coils 16, 17, 18, 19. The magnet 14 is located on the axis which is common to the coils 16 and 17 which are placed on each side of said magnet at a short distance from this latter, and the magnet 15 occupies the same position relatively to the coils 18 and 19. Accordingly, each magnet 14 or 15 is designed to draw with it the arm (namely the arm 3 or 4) on which it is carried while performing an oscillatory or swinging movement within the space which is formed between the two coils and between which said magnet is enclosed (namely the coils 16 and 17 or the coils 18 and 19).

In addition, each of the coils 16 and 17 is connected electrically to one of the coils 18 and 19 in such a manner that the two coils which are connected together tend at each moment to produce the same movement of the inertia fly-wheel 1.

Provision is made at the extremities of the arms 3, 4, 5 and 6 for plates having the shape of a circular arc which form the moving armatures of capacitors 20, 21, 22 and 23. The stationary armatures of said capacitors are integral with a horizontal circular ring 24 which surrounds the fly-wheel 1. The said ring 24 is stationary while measurements are being taken and is only intended to move about its own axis in order to permit the possibility of positioning the entire assembly.

The diametrically opposite capacitors 20 and 21 on the one hand and 22 and 23 on the other hand are connected together by means of their moving armatures and by means of their stationary armatures. Accordingly, each by means of their stationary armatures. Accordingly, each group of variable capacitors 20 and 21 on the one hand and 22 and 23 on the other hand behaves as a variable capacitor whose capacitance is equal to the sum of capacitances of the two capacitors constituting said group. These capacitors are practically insensitive to spurious transverse movements. In fact, a horizontal displacement of the fly-wheel 1 results in a reduction of the distance between the armatures of a capacitor and a simultaneous increase by an equal quantity in the distance between the armatures of the capacitor which is located diametrically opposite. Since these two capacitors are connected in parallel, the variations in capacitance are opposed and balance each other. Furthermore, the stationary armatures of the capacitors have a greater length in the vertical direction than the moving armatures in order to maintain constant the surface area of the oppositely facing armatures at the time of a movement of the flywheel about a horizontal axis and in order to decrease in this manner the influence which the vertical movement of the moving armatures would have on the values of the capacitances.

The stationary armatures of the capacitors are placed on the ring 24 in such a manner that, at the time of a pivotal movement of the fly-wheel 1 about the spindle 2, the variations in capacitance of the two groups of capacitors are opposed. These two groups of variable capacitors form, in the example described, the control element of two oscillators 25 and 26. A variation in the capacitance of one group of capacitors at the time of an oscillatory movement of the torsion pendulum results in a variation in the frequency of the corresponding oscillator which is proportional to said variation of capacitance and hence to the amplitude of the oscillatory movement of the torsion pendulum. Since the variations in the capacitance of two groups are opposed, the frequency variations of the corresponding oscillators are also opposed.

The device according to the invention makes it possible to observe very small oscillatory movements of the pendulum. In fact, a single oscillator does not have a sufficient degree of absolute stability for reproducible measurement whereas two identical oscillators with thermostats permit of compensation for drift which is always possible.

The output terminals 27 and 28 respectively of the oscillators 25 and 26 are connected to a beat frequency-generator 29 of known type which has formed the subject of French Patent No. 1,303,504. Said frequency generator 29 mainly consists of a frequency-changer 30 to which are applied the two output signals which are emitted by the oscillators, a unit 31 which supplies the reference frequency and which is connected to the frequency-changer 30, and a shaping and detecting device 32 which is connected to the output terminals of the aforesaid frequency-changer 30.

The frequency-generator 29 permits the possibility of converting the frequency variations of the oscillators 25 and 26 into a voltage which is proportional to the frequency swing with the requisite precision. The output terminals 33 and 34 of the frequency generator 29 are connected respectively to the input terminals 35 and 36 of an amplifier 37. A differential circuit arrangement serves to amplify the output voltage of the frequency-generator.

The terminals 38 and 39 of the amplifier 37 are connected to an amplitude regulator 40 which comprises a contactor 41 and means for comparing any amplitude with the preceding through the intermediary of a reference voltage, and means for automatic correction of the gain of the amplifier 37 in order to ensure that this latter transmits to the groups of coils 16 to 19 through the intermediary of the output terminals 42 and 43 of the amplifier only the energy which is necessary for the conservation of the amplitude of oscillation which has been chosen. A memory of storage system 50 makes it possible to retain the image of the amplitude throughout the time which is necessary for the comparison.

The terminals 44 and 45 of the amplifier 37 are connected to the measuring instrument 46 proper. This instrument consists of a dividing potentiometer 47 which serves to adjust the sensitivity of the measurement, and a dial 48 on which is shown the value of the characteristic of internal friction which it is sought to determine.

For example, the coefficient of internal friction is obtained by establishing the ratio of the energy supplied to the coils to the amplitude of oscillatory movements of the pendulum. These values are measured on the amplifier 37 and transmitted to the instrument 46 which establishes said ratio.

The operation of the installation is as follows:

The pivotal motion of the inertia fly-wheel 1 about the spindle 2 produces a variation in the values of the two groups of capacitors 20 and 21 on the one hand, 22 and 23 on the other hand which are coupled to the oscillators 25 and 26. The said oscillators transform these variations in capacitance into frequency variations which are proportional to said variations in capacitance and consequently to the amplitude of the oscillatory movements of the pendulum.

The frequency variations referred to are transmitted to the frequency-generator 29 which delivers at the output a voltage which is proportional to said variations and therefore to the amplitude of the oscillatory movements of the pendulum. This voltage is directed to the amplifier 37 which compares it with a reference voltage supplied by the amplitude regulator 40. The automatic regulation of the gain of the amplifier adjusts the setting of the amplitude in such a manner as to supply the coils 17 to 19 only with the energy which is necessary for the conservation of the amplitude. This energy is directed by the amplifier 37 in the form of a current which is proportional to the difference between the reference voltage and the amplified output voltage of the frequency-generator 29.

The characteristic which it is sought to determine is read on the dial 48. The regulating knob 47 offers the possibility of choosing a sensitivity which is compatible with the measurements taken. The contactor 41 makes it possible to vary the value of amplitude of the oscillations and consequently to take measurements in respect of a number of different deformations of the sample.

The heat-insulated chamber 8, which can be heated or cooled at will, offers the possibility of taking measurements of the characteristics of internal friction of the material which constitutes the torsion wire 7 at all temperatures. It is thus possible during the temperature rise of the material to plot from point to point a conventional curve which represents the variations in the coefficient of internal friction of any material as a function of temperature.

As will readily be understood, the instrument can also be employed for the determination of the modulus of elasticity of the material as a function of temperature, the modulus of elasticity being in that case deduced from the frequency of oscillatory movements of the pendulum.

What we claim is:

1. Device for the determination of the characteristics of internal friction of a sample comprising a torsion pendulum, the torsion wire of which is constituted by the sample, a first oscillator in which the tuned circuit comprises an element which is coupled to the pendulum so as to modulate its frequency with a swing which is proportional to the amplitude of oscillatory movements of the pendulum, a frequency-generator designed to supply a voltage which is proportional to the frequency swing of the first oscillator, means for measuring said voltage and its difference with respect to a reference voltage and means for correcting the amplitude of the oscillatory movements of the torsion pendulum so as to reduce said difference to zero, a memory system for storing the voltage proportional to the frequency swing, the reference voltage being constituted by the preceding voltage stored in a memory system.

2. Device in accordance with claim 1 including a second oscillator which is similar to said first oscillator, the frequency modulation of which is equal and in opposite phase with respect to that of said first oscillator.

3. Device in accordance with claim 1, wherein the means for measuring the difference between the voltage supplied by the frequency-generator and the reference voltage include an amplifier emitting a current which is proportional to said difference and the means for correcting the amplitude of the oscillatory movements of the pendulum inductance coils which are fed by said current and which act on magnets carried by said pendulum.

4. Device in accordance with claim 1, wherein the element of the oscillator which is coupled to the pendulum consists of at least one variable capacitor, the moving armatures of which are carried by the torsion pendulum.

References Cited by the Examiner

UNITED STATES PATENTS

| 2,150,377 | 3/1939 | Keinath | 73—99 X |
| 2,836,060 | 5/1958 | Ciringione et al. | 73—99 |

OTHER REFERENCES

Roberts, H. C.: Mechanical Measurements by Electrical Methods, The Instruments Publishing Co., Inc., Pittsburg, 1951. Pages 18 and 19.

RICHARD C. QUEISSER, *Primary Examiner.*

J. W. MYRACLE, *Assistant Examiner.*